(12) United States Patent
Nishio

(10) Patent No.: US 12,420,596 B2
(45) Date of Patent: Sep. 23, 2025

(54) PNEUMATIC TIRE

(71) Applicant: The Yokohama Rubber Co., Ltd., Kanagawa (JP)

(72) Inventor: Koji Nishio, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 0 days.

(21) Appl. No.: 18/573,233

(22) PCT Filed: Mar. 28, 2022

(86) PCT No.: PCT/JP2022/014789
§ 371 (c)(1),
(2) Date: Dec. 21, 2023

(87) PCT Pub. No.: WO2023/276367
PCT Pub. Date: Jan. 5, 2023

(65) Prior Publication Data
US 2025/0074120 A1    Mar. 6, 2025

(30) Foreign Application Priority Data
Jun. 30, 2021   (JP) ................. 2021-108832

(51) Int. Cl.
*B60C 15/06* (2006.01)
*B60C 15/00* (2006.01)
(52) U.S. Cl.
CPC ...... *B60C 15/0635* (2013.01); *B60C 15/0009* (2013.01); *B60C 15/0653* (2013.01);
(Continued)

(58) Field of Classification Search
CPC ............ B60C 15/0628; B60C 15/0653; B60C 2015/0657; B60C 2015/066;
(Continued)

(56) References Cited

U.S. PATENT DOCUMENTS 4,398,584 A * 8/1983 Tansei ............... B60C 15/06
152/546
4,688,616 A * 8/1987 Iuchi ............... B60C 15/06
152/546
(Continued)

FOREIGN PATENT DOCUMENTS

JP          62-137207 A     6/1987
JP          2017-114451 A   6/2017
(Continued)

*Primary Examiner* — Kendra Ly
(74) *Attorney, Agent, or Firm* — Thorpe North & Western

(57) ABSTRACT

Provided is a pneumatic tire in which fiber reinforced layers on an outer side of a steel reinforced layer in a width direction each include fiber cords arranged in one direction, the fiber cords being oriented to cross each other between layers, a radially outer end of one of the fiber reinforced layers being radially outward of a turned-up end portion of a carcass layer, a radially outer end portion of another one of the fiber reinforced layers being radially inward of the turned-up end portion and radially outward of a line segment (K). Radially inner end portions of the fiber reinforced layers are inward in the width direction of a line segment (J), and cord angles θA and θB of the fiber reinforced layers satisfy $20° \leq |\theta A| \leq 45°$ or $70° \leq |\theta A| \leq 90°$, and $20° \leq |\theta B| \leq 45°$ or $70° \leq |\theta B| \leq 90°$.

18 Claims, 8 Drawing Sheets

(52) U.S. Cl.
CPC ............... *B60C 2015/009* (2013.01); *B60C 2015/0617* (2013.01); *B60C 2015/0625* (2013.01); *B60C 2015/066* (2013.01); *B60C 2015/0664* (2013.01); *B60C 2015/0667* (2013.01); *B60C 2015/0685* (2013.01); *B60C 2015/0692* (2013.01)

(58) Field of Classification Search
CPC .... B60C 2015/0664; B60C 2015/0667; B60C 2015/0671
See application file for complete search history.

(56) References Cited

U.S. PATENT DOCUMENTS 4,790,366 A * 12/1988 Kadota ............... B60C 15/0607
152/546
2018/0370295 A1* 12/2018 Nishio ................ B60C 15/0653

FOREIGN PATENT DOCUMENTS

| | | |
|---|---|---|
| JP | 6554957 B2 | 8/2019 |
| WO | 2020/090363 A1 | 5/2020 |

* cited by examiner

PNEUMATIC TIRE

TECHNICAL FIELD

The present technology relates to a pneumatic tire in which a carcass layer is turned up around a bead core of each bead portion from a tire inner side to a tire outer side, and particularly relates to a pneumatic tire that can effectively suppress separation starting from a radially outer end portion of an organic fiber reinforced layer embedded in the bead portion while suppressing separation starting from a turned-up end portion of the carcass layer.

BACKGROUND ART

In some heavy duty pneumatic tires used for trucks, buses, and the like, a carcass layer is mounted between a pair of bead portions and turned up around a bead core of each bead portion from a tire inner side to a tire outer side, and a steel reinforced layer including a plurality of steel cords is disposed in each bead portion to wrap the carcass layer. In such a pneumatic tire, for the purpose of preventing separation starting from the turned-up end portion of the carcass layer, two organic fiber reinforced layers including a plurality of organic fiber cords arranged in one direction and disposed so that the organic fiber cords intersect with each other between the layers are embedded on the outer side of the steel reinforced layer in the tire width direction (for example, see Japan Patent No. 65549857 B).

However, when the two organic fiber reinforced layers that are cross-layered are disposed in the bead portion, there is a problem in that separation starting from the radially outer end portion is likely to occur. Specifically, since the two organic fiber reinforced layers are disposed so that the end positions thereof are shifted from each other, one of the organic fiber reinforced layers becomes a single layer at the radially outer end portion. When the two cross-layered organic fiber reinforced layers are lifted up to the outer side in the tire radial direction in the tire molding step, the angle of the organic fiber reinforced layer tends to increase in the single layer region outside the layered region. As a result, a tension generated in the organic fiber cords constituting the organic fiber reinforced layer is increased, and separation starting from the radially outer end portion is likely to occur.

SUMMARY

The present technology provides a pneumatic tire that can effectively suppress separation starting from a radially outer end portion of an organic fiber reinforced layer embedded in a bead portion while suppressing separation starting from a turned-up end portion of the carcass layer.

A pneumatic tire according to an embodiment of the present technology includes: a tread portion extending in a tire circumferential direction and having an annular shape; a pair of sidewall portions disposed on both sides of the tread portion; and a pair of bead portions disposed on inner sides of the sidewall portions in a tire outer diameter direction, a carcass layer being mounted between the pair of bead portions, the carcass layer being turned up around a bead core of each of the bead portions from a tire inner side to a tire outer side, and a steel reinforced layer including a plurality of steel cords being disposed in each of the bead portions so as to wrap the carcass layer,
first and second organic fiber reinforced layers being disposed on an outer side of the steel reinforced layer in a tire width direction, each of the first and second organic fiber reinforced layers including a plurality of organic fiber cords arranged in one direction, and the organic fiber cords constituting the first and second organic fiber reinforced layers being oriented so as to cross each other between layers,
a radially outer end portion of the first organic fiber reinforced layer being positioned more on an outer side in a tire radial direction than a turned-up end portion of the carcass layer, and a radially outer end portion of the second organic fiber reinforced layer being positioned more on an inner side in the tire radial direction than the turned-up end portion of the carcass layer and more on the outer side in the tire radial direction than a line segment formed by a horizontal line drawn in the tire width direction from an apex of the bead core protruding farthest to the outer side in the tire radial direction,
radially inner end portions of the first and second organic fiber reinforced layers being both positioned more on an inner side in the tire width direction than a line segment formed by a normal line drawn from an apex of the bead core protruding farthest to the inner side in the tire radial direction to a surface of a bead base, and
a cord angle $\theta_A$ of the first organic fiber reinforced layer with respect to the tire circumferential direction being in a range $20° \leq |\theta_A| \leq 45°$ or $70° \leq |\theta_A| \leq 90°$, and a cord angle $\theta_B$ of the second organic fiber reinforced layer with respect to the tire circumferential direction being in a range $20° \leq |\theta_B| \leq 45°$ or $70° \leq |\theta_B| \leq 90°$.

As a result of diligent research on a tire structure in which an organic fiber reinforced layer is disposed in a bead portion, the present inventor has found that cross-layered organic fiber reinforced layers suppress rubber flow in the bead portion during vulcanization, thereby bringing a carcass layer closer to an equilibrium carcass line and suppressing separation starting from a turned-up end portion of the carcass layer, in other words, has found that there is no need to cross-layer the organic fiber reinforced layers at or near the turned-up end portion of the carcass layer, and has made the present technology.

That is, in the present technology, cross-laminated first and second organic fiber reinforced layers are disposed on the outer side of the steel reinforced layer in the tire width direction, and both of the first and second organic fiber reinforced layers are extended to at least below the bead core with reference to a line segment composed of a normal line drawn from the apex of the bead core protruding farthest to the inner side in the tire radial direction to the surface of a bead base, and thus rubber flow in the bead portion is suppressed during vulcanization, the position of the bead core is shifted to a toe side, and the carcass layer can be brought closer to the equilibrium carcass line. This allows suppression of separation starting from the turned-up end portion of the carcass layer. The radially outer end portion of the first organic fiber reinforced layer is disposed more on the outer side in the tire radial direction than the turned-up end portion of the carcass layer, while the radially outer end portion of the second organic fiber reinforced layer is disposed more on the inner side in the tire radial direction than the turned-up end portion of the carcass layer and more on the outer side in the tire radial direction than a line segment formed by a horizontal line drawn in the tire width direction from the apex of the bead core protruding farthest to the outer side in the tire radial direction, thereby reducing a lift rate when the cross-layered first and second organic fiber reinforced layers are lifted on the outer side in the tire radial direction in the tire molding step, and preventing the first organic fiber reinforced layer from increasing in angle at or near the radially outer end portion. As a result, a cord angle $\theta_A$ of the first organic fiber reinforced layer with respect to the tire circumferential direction and a cord angle $\theta_B$ of the second organic fiber reinforced layer with respect to the tire circumferential direction can be set in a range in which the tension generated in the organic fiber cords becomes small, and separation starting from the radially outer end portions of the first and second organic fiber reinforced layers can be effectively suppressed.

In the present technology, when the cord inclination directions of the first and second organic fiber reinforced layers with respect to the tire circumferential direction are opposite to each other, the cord angle $\theta_A$ of the first organic fiber reinforced layer with respect to the tire circumferential direction is preferably in a range $20°\leq|\theta_A|\leq 45°$. By setting the cord angle $\theta_A$ of the first organic fiber reinforced layer whose radially outer end portion is a single layer to be small as described above, the separation starting from the radially outer end portion of the first organic fiber reinforced layer can be effectively suppressed. Since the cord inclination directions of the first and second organic fiber reinforced layers with respect to the tire circumferential direction are opposite to each other, the rubber flow of the bead portion during vulcanization can be effectively suppressed.

In the present technology, when the cord inclination directions of the first and second organic fiber reinforced layers with respect to the tire circumferential direction are the same, it is preferable that the cord angle $\theta_A$ of the first organic fiber reinforced layer with respect to the tire circumferential direction be in the range $20°\leq|\theta_A|\leq 45°$, and the cord angle $\theta_B$ of the second organic fiber reinforced layer with respect to the tire circumferential direction be in the range $|\theta_A|+20\leq|\theta_B|$. By setting the cord angle $\theta_A$ of the first organic fiber reinforced layer whose radially outer end portion is a single layer to be small as described above, the separation starting from the radially outer end portion of the first organic fiber reinforced layer can be effectively suppressed. By making the cord angle $\theta_B$ of the second organic fiber reinforced layer sufficiently larger than the cord angle $\theta_A$ of the first organic fiber reinforced layer, the rubber flow of the bead portion during vulcanization can be effectively suppressed.

It is preferable that a distance $A_h$ from a bead heel apex of the bead portion to the radially outer end portion of the first organic fiber reinforced layer and a distance $P_h$ from the bead heel apex of the bead portion to a turned-up end portion of the carcass layer satisfy the relationship $A_h-P_h\geq 5.0$ mm. This mitigates stress concentration at the turned-up end portion of the carcass layer, allowing effective suppression of separation starting from the turned-up end portion.

It is preferable that a crack suppression layer be embedded at a position adjacent to the turned-up end portion of the carcass layer, an end portion of the steel reinforced layer on the outer side in the tire width direction, the radially outer end portion of the first organic fiber reinforced layer, and the radially outer end portion of the second organic fiber reinforced layer, 100% modulus $Kc_{M100}$ of the crack suppression layer be in the range 4.5 MPa$\leq Kc_{M100}\leq$10.0 MPa, and elongation at break $Kc_{EB}$ of the crack suppression layer be in the range 300%$\leq Kc_{EB}$. This allows effective suppression of separation starting from the turned-up end portion of the carcass layer, the radially outer end portion of the first organic fiber reinforced layer, and the radially outer end portion of the second organic fiber reinforced layer. Note that the 100% modulus and the elongation at break are measured in accordance with JIS (Japanese Industrial Standard) K 6251.

It is preferable that one of the first and second organic fiber reinforced layers be an inner organic fiber reinforced layer positioned on the inner side in the tire width direction, and the other of the first and second organic fiber reinforced layers be an outer organic fiber reinforced layer positioned on the outer side in the tire width direction, the outer organic fiber reinforced layer be disposed so as to cover a radially inner end portion of the inner organic fiber reinforced layer, and a radially inner end portion of the outer organic fiber reinforced layer be separated from the radially inner end portion of the inner organic fiber reinforced layer by 5 mm or more and be positioned more on the inner side in the tire radial direction than a line segment formed by a horizontal line drawn in the tire width direction from an end portion of the steel reinforced layer on the outer side in the tire width direction. In this case, even if the toe of the bead portion is deformed when removing the rim, separation starting from the radially inner end portion of the outer organic fiber reinforced layer and the radially inner end portion of the inner organic fiber reinforced layer is less likely to occur.

Each of the fiber structures of organic fiber cords constituting the first and second organic fiber reinforced layers is preferably in a range from 800 dtex/2 to 1500 dtex/2. By making the organic fiber cords constituting the first and second organic fiber reinforced layers thin in this way, a step portion formed when one of the first and second organic fiber reinforced layers is disposed so as to cover the radially inner end portion of the other of the first and second organic fiber reinforced layers can be made small, stress concentration on the step portion can be reduced, and separation starting from the step portion of the first or second organic fiber reinforced layer can be suppressed. Since the organic fiber cords constituting the first and second organic fiber reinforced layers have a necessary minimum thickness, an effect of suppressing the rubber flow can also be exhibited.

Preferably, a distance A measured along a straight line extending through an apex of the bead core protruding farthest to the outer side in the width direction and being parallel to a longest side of the bead core, the distance A being from the apex to the bead heel position, is in the range 2.5 mm$\leq$A$\leq$5.5 mm. By sufficiently securing the distance A in this way, the position of the bead core is shifted to the toe side, and the angle formed by the toe of the bead portion can be increased. As a result, the rigidity of the toe of the bead portion is increased, and separation starting from the radially inner end portion of the first organic fiber reinforced layer and the radially inner end portion of the second organic fiber reinforced layer is less likely to occur.

DETAILED DESCRIPTION

Figure 1:
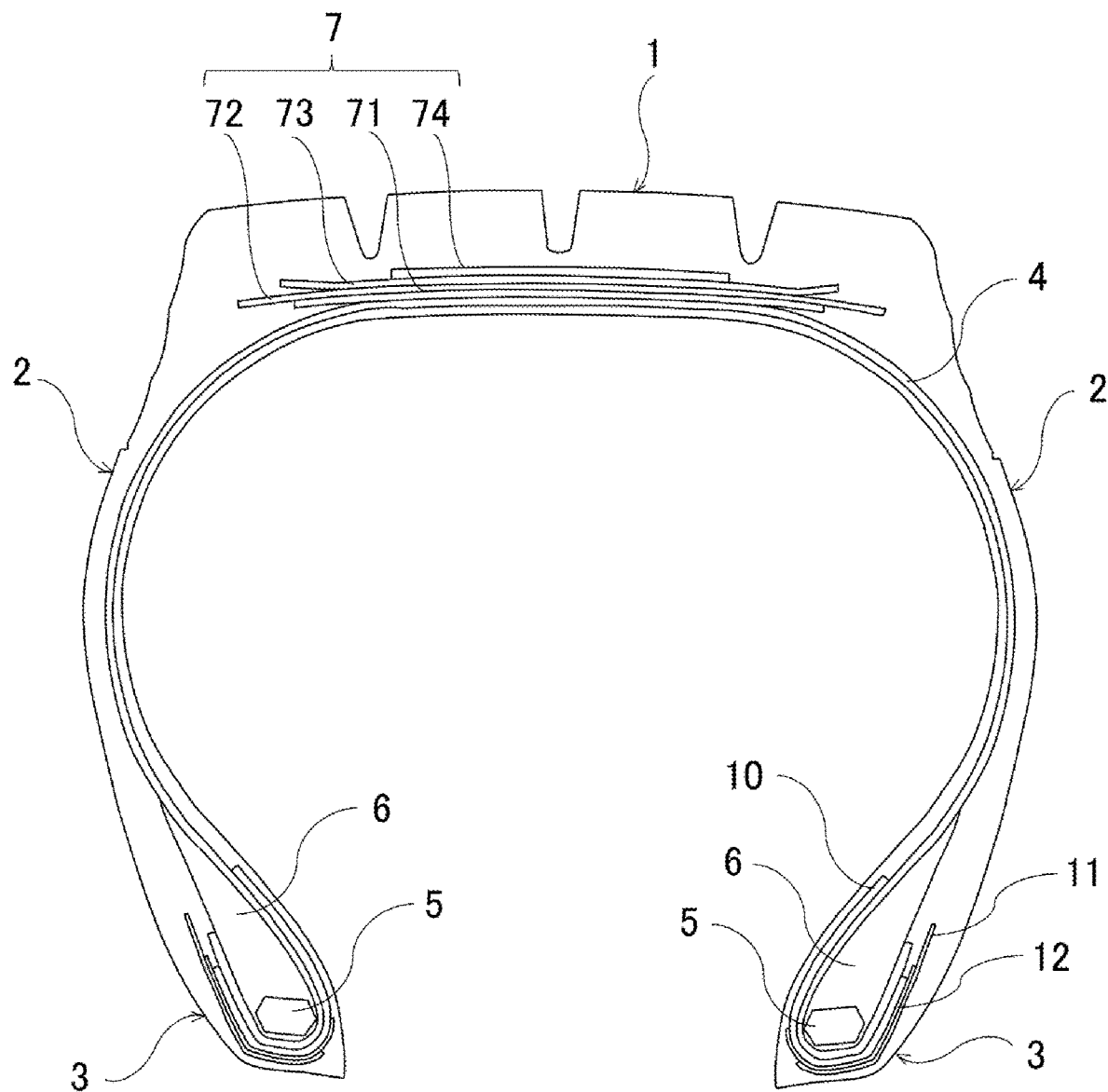
FIG. 1 is a meridian cross-sectional view illustrating a heavy duty pneumatic tire according to an embodiment of the present technology.
Figure 2:
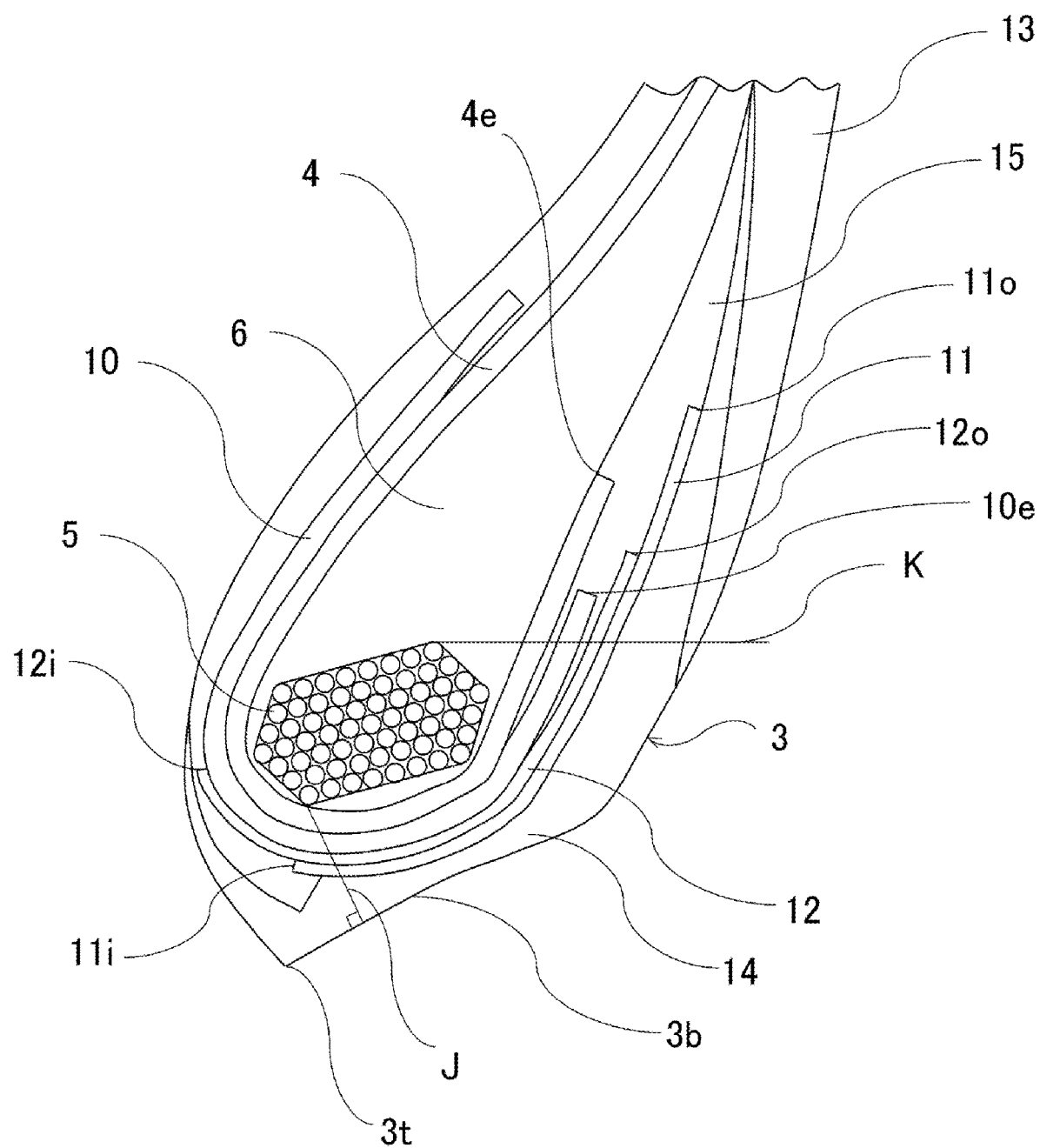
FIG. 2 is a cross-sectional view of a bead portion of the pneumatic tire in FIG. 1.
Figure 3:
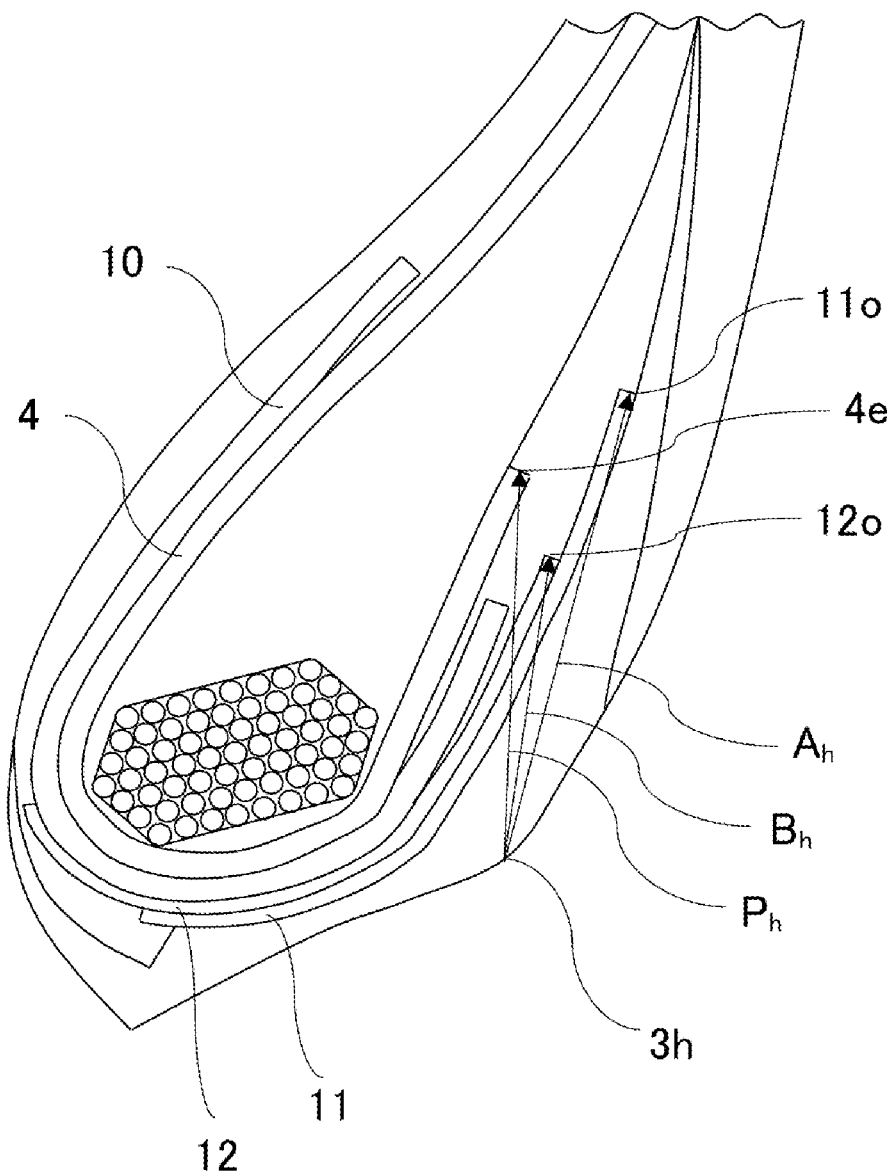
FIG. 3 is another cross-sectional view illustrating the bead portion of the pneumatic tire in FIG. 1.
Figure 4:
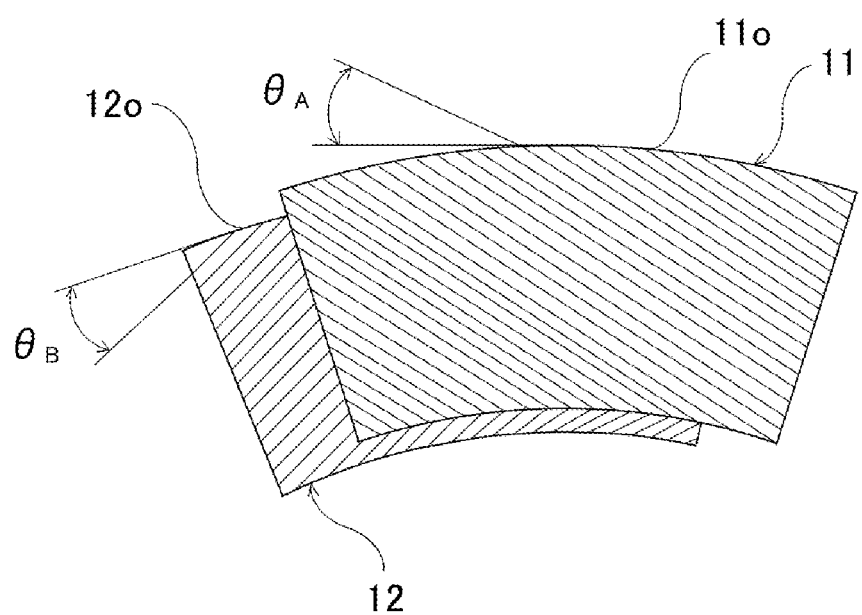
FIG. 4 is a side view illustrating an organic fiber reinforced layer embedded in the bead portion.

Configurations of embodiments of the present technology will be described in detail below with reference to the accompanying drawings. FIG. 1 illustrates a heavy duty pneumatic tire according to an embodiment of the present technology, and FIGS. 2 to 4 illustrate the main portion of the pneumatic tire.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed on an inner side of the sidewall portions 2 in the tire radial direction.

A carcass layer 4 is mounted between the pair of bead portions 3, 3. The carcass layer 4 includes a plurality of steel cords extending in the tire radial direction and is turned up around a bead core 5 disposed in each of the bead portions 3 from a tire inner side to a tire outer side. A bead filler 6 having a triangular cross-sectional shape and formed of a rubber composition is disposed on the outer circumference of the bead core 5.

Four belt layers 7 are embedded on the radially outer side of the carcass layer 4 in the tread portion 1. Each of the belt layers 7 includes a plurality of belt cords (steel cords) inclined with respect to the tire circumferential direction. The belt layers 7 include two central main belt layers 72 and 73 with belt cords intersecting with each other, and auxiliary belt layers 71 and 74 disposed on the radially inner side and the radially outer side of the main belt layers 72 and 73. The inclination angle of the belt cords constituting the main belt layers 72 and 73 with respect to the tire circumferential direction is set to range from 15° to 35°, for example, and the inclination angle of the belt cords constituting the auxiliary belt layers 71 and 74 with respect to the tire circumferential direction is set to range from 15° to 75°, for example.

In the pneumatic tire described above, a steel reinforced layer 10 including a plurality of steel cords is disposed in each of the bead portions 3 so as to wrap around the carcass layer 4, the bead core 5, and the bead filler 6. First and second organic fiber reinforced layers 11 and 12 are disposed on the outer side of the steel reinforced layer 10 in the tire width direction. Each of the first and second organic fiber reinforced layers 11 and 12 includes a plurality of organic fiber cords that are arranged in one direction, and the organic fiber cords constituting the first and second organic fiber reinforced layers 11 and 12 are oriented so as to cross each other between the layers.

As illustrated in FIG. 2, a radially outer end portion 11o of the first organic fiber reinforced layer 11 is positioned more on the outer side in the tire radial direction than a turned-up end portion 4e of the carcass layer 4. On the other hand, a radially outer end portion 12o of the second organic fiber reinforced layer 12 is positioned more on the inner side in the tire radial direction than the turned-up end portion 4e of the carcass layer 4 and more on the outer side in the tire radial direction than a line segment K formed by a horizontal line drawn in the tire width direction from the apex of the bead core 5 protruding farthest to the outer side in the tire radial direction. That is, although the first and second organic fiber reinforced layers 11 and 12 are layered, they have a single layer structure in the vicinity of the turned-up end portion 4e of the carcass layer 4. The horizontal line for specifying the line segment K is specified when no load is applied to the single tire.

Radially inner end portions 11i and 12i of the first and second organic fiber reinforced layers 11 and 12 are both positioned more on the inner side in the tire width direction than a line segment J formed by a normal line drawn from the apex of the bead core 5 protruding farthest to the inner side in the tire radial direction to the surface of a bead base 3b. That is, the first and second organic fiber reinforced layers 11 and 12 extend to below the bead core 5.

As illustrated in FIG. 4, the cord angle $\theta_A$ of the first organic fiber reinforced layer 11 with respect to the tire circumferential direction is set in the range $20° \leq |\theta_A| \leq 45°$ or $70° \leq |\theta_A| \leq 90°$, and the cord angle $\theta_B$ of the second organic fiber reinforced layer 12 with respect to the tire circumferential direction is set in the range $20° \leq |\theta_B| \leq 45°$ or $70° \leq |\theta_B| \leq 90°$. The cord angles $\theta_A$ and $\theta_B$ are angles of the organic fiber cords with respect to the tire circumferential direction measured at the radially outer end portions 11o and 12o of the first and second organic fiber reinforced layers 11 and 12. The cord inclination direction with respect to the tire circumferential direction of the first and second organic fiber reinforced layers 11 and 12 may be any direction. For example, the cord angles $\theta_A$ and $\theta_B$ of the first and second organic fiber reinforced layers 11 and 12 have a positive value (+) when the organic fiber cords constituting them are inclined to one side with respect to the tire circumferential direction, and have a negative value (−) when the organic fiber cords constituting them are inclined to the other side with respect to the tire circumferential direction.

According to the pneumatic tire described above, since the cross-layered first and second organic fiber reinforced layers 11 and 12 are disposed on the outer side of the steel reinforced layer 10 in the tire width direction and both the first and second organic fiber reinforced layers 11 and 12 extend to at least below the bead core 5 with reference to the line segment J formed by the normal line drawn from the apex of the bead core 5 protruding farthest to the inner side in the tire radial direction to the surface of the bead base 3b, the rubber flow of the bead portion 3 during vulcanizing is suppressed, the position of the bead core 5 is shifted to a toe 3t side, and the carcass layer 4 can be brought closer to the equilibrium carcass line. This allows suppression of separation starting from the turned-up end portion 4e of the carcass layer 4.

The radially outer end portion 11o of the first organic fiber reinforced layer 11 is disposed more on the outer side in the tire radial direction than the turned-up end portion 4e of the carcass layer 4, while the radially outer end portion 12o of the second organic fiber reinforced layer 12 is disposed more on the inner side in the tire radial direction than the turned-up end portion 4e of the carcass layer 4 and more on the outer side in the tire radial direction than the line segment K formed by a horizontal line drawn in the tire width direction from the apex of the bead core 5 protruding farthest to the outer side in the tire radial direction, thereby reducing a lift rate when the cross-layered first and second organic fiber reinforced layers 11 and 12 are lifted on the outer side in the tire radial direction in the tire molding step, and preventing the first organic fiber reinforced layer 11 from increasing in angle at or near the radially outer end portion 11o. Note that, since the first organic fiber reinforced layer 11 extends more to the outer side in the tire radial direction than the turned-up end portion 4e of the carcass layer 4, the effect of suppressing the rubber flow of the bead portion 3 during vulcanizing is sufficiently secured.

Since the first organic fiber reinforced layer 11 is prevented from increasing in angle at or near the radially outer end portion 11o as described above, the cord angle $\theta_A$ of the first organic fiber reinforced layer 11 with respect to the tire circumferential direction and the cord angle $\theta_B$ of the second organic fiber reinforced layer with respect to the tire circumferential direction can be set in a range in which the tension generated in the organic fiber cords becomes small, and the separation starting from the radially outer end portions 11o and 12o of the first and second organic fiber reinforced layers 11 and 12 can be effectively suppressed.

Figure 5:
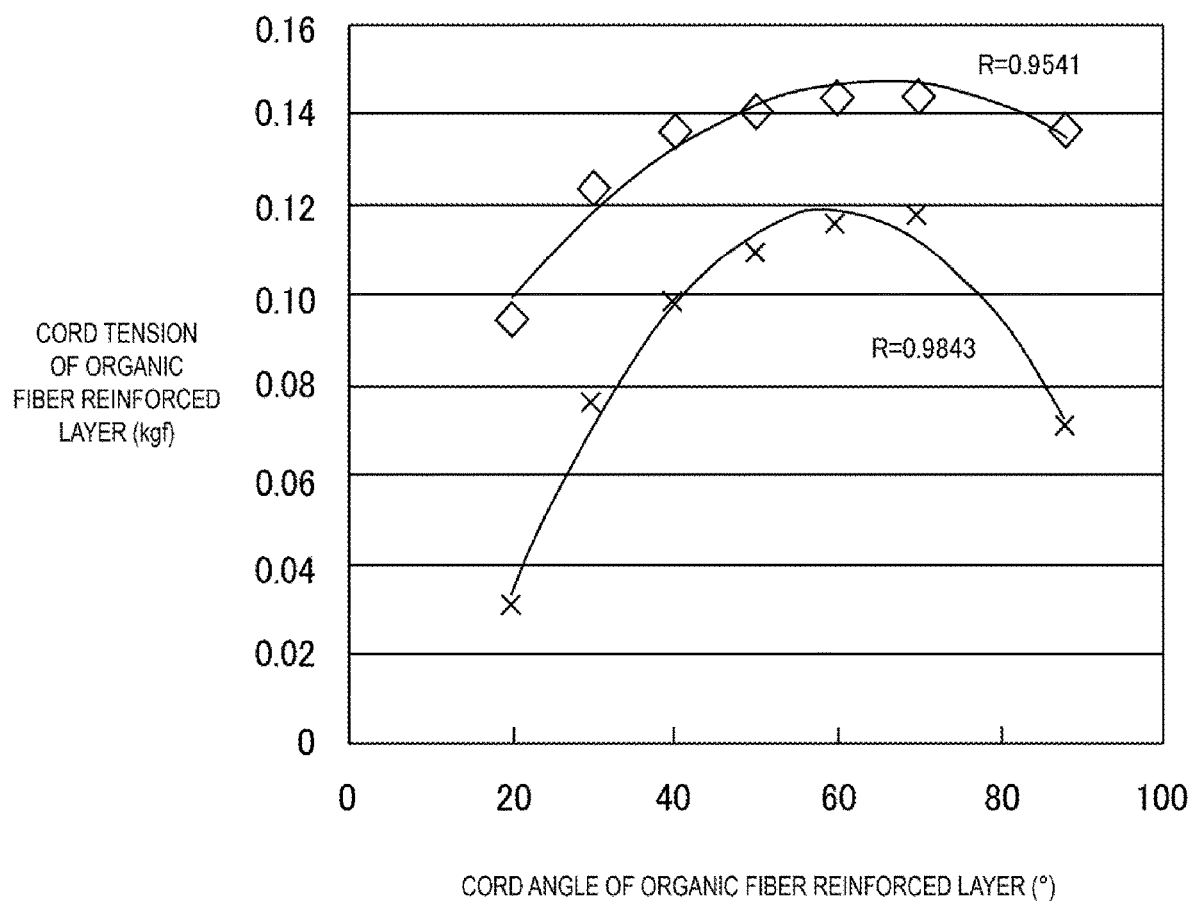
FIG. 5 is a graph showing the relationship between the cord angle and the tension of the organic fiber reinforced layer.

FIG. 5 shows the relationship between the cord angle and the tension of the organic fiber reinforced layer. In FIG. 5, "◇" indicates data of the first organic fiber reinforced layer 11 including a plurality of organic fiber cords arranged in one direction, and "x" indicates data of the second organic fiber reinforced layer 12 including a plurality of organic fiber cords arranged in one direction. As illustrated in FIG. 5, the tension of the first organic fiber reinforced layer 11 tends to decrease when the cord angle $\theta_A$ with respect to the tire circumferential direction is in the range $20°\le|\theta_A|\le45°$ or $70°\le|\theta_A|\le90°$, and the tension of the second organic fiber reinforced layer 12 tend to decrease when the cord angle $\theta_B$ with respect to the tire circumferential direction is in the range $20°\le|\theta_B|\le45°$ or $70°\le|\theta_B|\le90°$. Therefore, by setting the cord angles $\theta_A$ and $\theta_B$ in the above-described range, an increase in tension can be avoided and separation starting from the radially outer end portions 11o and 12o of the first and second organic fiber reinforced layers 11 and 12 can be suppressed.

Here, when the cord angle $\theta_A$ of the first organic fiber reinforced layer 11 is in the range $45°<|\theta_A|<70°$, separation starting from the radially outer end portion 11o of the first organic fiber reinforced layer 11 is likely to occur. Similarly, when the cord angle θB of the second organic fiber reinforced layer 12 is in the range $45°<|\theta_B|<70°$, separation starting from the radially outer end portion 12o of the second organic fiber reinforced layer 12 is likely to occur. When the cord angles $|\theta_A|$ and $|\theta_B|$ are less than 20°, it is difficult to lift up the cross-layered first and second organic fiber reinforced layers 11 and 12 on the outer side in the tire radial direction in the tire molding step. In particular, it is preferable that the cord angle $\theta_A$ of the first organic fiber reinforced layer 11 with respect to the tire circumferential direction be set in the range $25°\le|\theta_A|\le40°$ or $75°\le|\theta_A|\le85°$, and the cord angle θB of the second organic fiber reinforced layer 12 with respect to the tire circumferential direction be set in the range $25°\le|\theta|\le40°$ or $75°\le|\theta_B|\le85°$.

As illustrated in FIG. 4, when the cord inclination directions of the first and second organic fiber reinforced layers 11 and 12 with respect to the tire circumferential direction and are opposite to each other, the cord angle θA of the first organic fiber reinforced layer 11 with respect to the tire circumferential direction is preferably in the range $20°\le|\theta_A|\le45°$, more preferably $20°\le\theta_A\le35°$. By setting the cord angle θA of the first organic fiber reinforced layer 11 in which the radially outer end portion 11o is a single layer to be small as described above, separation starting from the radially outer end portion 11o of the first organic fiber reinforced layer 11 can be effectively suppressed. Since the cord inclination directions of the first and second organic fiber reinforced layers 11 and 12 with respect to the tire circumferential direction are opposite to each other, the rubber flow of the bead portion during vulcanization can be effectively suppressed. As a result, equilibration of the carcass line can be promoted.

Figure 6:
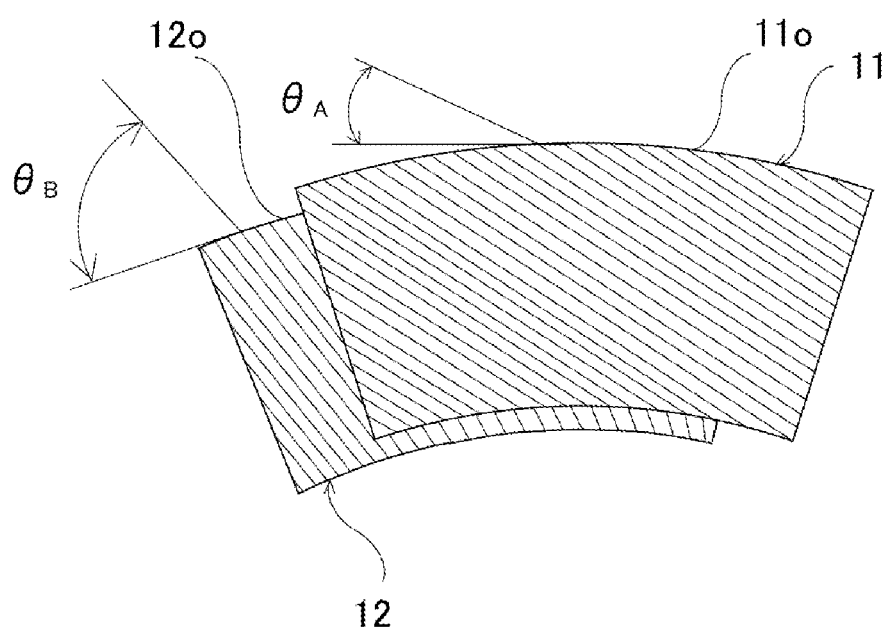
FIG. 6 is a side view illustrating an modified example of the organic fiber reinforced layer embedded in the bead portion.

FIG. 6 illustrates a modified example of the organic fiber reinforced layer embedded in the bead portion. As illustrated in FIG. 6, the cord inclination directions of the first and second organic fiber reinforced layers 11 and 12 with respect to the tire circumferential direction may be the same direction. In this case, the cord angle $\theta_A$ of the first organic fiber reinforced layer 11 with respect to the tire circumferential direction is preferably in the range $20°\le|\theta_A|\le45°$, more preferably in the range $20°\le|\theta_A|\le40°$, and the cord angle $\theta_B$ of the second organic fiber reinforced layer 12 with respect to the tire circumferential direction is preferably in the range $|\theta_A|+20\le|\theta_B|$. By setting the cord angle $\theta_A$ of the first organic fiber reinforced layer 11 in which the radially outer end portion 11o is a single layer to be small as described above, separation starting from the radially outer end portion 11o of the first organic fiber reinforced layer 11 can be effectively suppressed. By making the cord angle $\theta_B$ of the second organic fiber reinforced layer 12 sufficiently larger than the cord angle $\theta_A$ of the first organic fiber reinforced layer 11, even when the cord inclination directions of the first and second organic fiber reinforced layers 11 and 12 are the same, the rubber flow of the bead portion during vulcanization can be effectively suppressed. As a result, equilibration of the carcass line can be promoted. Since the first and second organic fiber reinforced layers 11 and 12 are cross-layered with the same sign, even when the cord angle $\theta_B$ of the second organic fiber reinforced layer 12 is larger than the cord angle $\theta_A$ of the first organic fiber reinforced layer 11 by 200 or more, the tension of the second organic fiber reinforced layer 12 is less likely to be increased, and therefore, separation starting from the radially outer end portion 12o of the second organic fiber reinforced layer 12 can be effectively suppressed.

As illustrated in FIG. 3, a distance $A_h$ from a bead heel apex 3h of the bead portion 3 to the radially outer end portion 11o of the first organic fiber reinforced layer 11 and a distance $P_h$ from the bead heel apex 3h of the bead portion 3 to the turned-up end portion 4e of the carcass layer 4 preferably satisfy the relationship $A_h-P_h\ge5.0$ mm. That is, it is preferable that the first organic fiber reinforced layer 11 sufficiently protrude toward the outer side in the tire radial direction beyond the turned-up end portion 4e of the carcass layer 4. This mitigates stress concentration at the turned-up end portion 4e of the carcass layer 4, allowing effective suppression of separation starting from the turned-up end portion 4e. Here, if $A_h-P_h<5.0$ mm, the effect of suppressing the separation of the carcass layer 4 starting from the turned-up end portion 4e is decreased. In particular, the relationship $A_h-P_h\ge8.0$ mm is preferably satisfied. Note that a distance $B_h$ from the bead heel apex 3h of the bead portion 3 to the radially outer end portion 12o of the second organic fiber reinforced layer 12 and the distance Ph from the bead heel apex 3h of the bead portion 3 to the turned-up end portion 4e of the carcass layer 4 satisfy the relationship $P_h\ge B_h$.

As illustrated in FIG. 2, a sidewall rubber layer 13 and a rim cushion rubber layer 14 exposed on the tire outer surface are disposed in a region extending from the sidewall portion 2 to the bead portion 3. In a region surrounded by the bead filler 6, the sidewall rubber layer 13, and the rim cushion rubber layer 14, a crack suppression layer 15 is embedded at a position adjacent to the turned-up end portion 4e of the carcass layer 4, an end portion 10e of the steel reinforced layer 10 on the outer side in the tire width direction, the radially outer end portion 11o of the first organic fiber reinforced layer 11, and the radially outer end portion 12o of the second organic fiber reinforced layer 12. Note that the turned-up end portion 4e of the carcass layer 4 and the end portion 10e of the steel reinforced layer 10 on the outer side in the tire width direction may be covered with an edge tape. When such an edge tape is added, the crack suppression layer 15 is adjacent to the turned-up end portion 4e of the carcass layer 4 and the end portion 10e of the steel reinforced layer 10 on the outer side in the tire width direction via the edge tape. The 100% modulus $Kc_{M100}$ of the crack suppression layer 15 is preferably in the range 4.5 MPa≤$Kc_{M100}$≤10.0 MPa, and the elongation at break $Kc_{EB}$ of the crack suppression layer 15 is preferably in the range 300%≤$Kc_{EB}$. This allows effective suppression of separation starting from the turned-up end portion 4e of the carcass layer 4, the radially outer end portion 11o of the first organic fiber reinforced layer 11, and the radially outer end portion 12o of the second organic fiber reinforced layer 12.

Here, if the 100% modulus $Kc_{M100}$ of the crack suppression layer 15 is less than 4.5 MPa, the stress concentration at the turned-up end portion 4e of the carcass layer 4, the radially outer end portion 11o of the first organic fiber reinforced layer 11, and the radially outer end portion 12o of the second organic fiber reinforced layer 12 is promoted, and there is a concern about the generation of separation starting therefrom. If the 100% modulus $Kc_{M100}$ of the crack suppression layer 15 exceeds 10.0 MPa, it is difficult to set the elongation at break $Kc_{EB}$ of the crack suppression layer 15 to 300% or more. When the elongation at break $Kc_{EB}$ of the crack suppression layer 15 is less than 300%, the effect of suppressing the separation starting from the turned-up end portion 4e of the carcass layer 4, the radially outer end portion 11o of the first organic fiber reinforced layer 11, and the radially outer end portion 12o of the second organic fiber reinforced layer 12 is decreased. The upper limit value of the elongation at break $Kc_{EB}$ of the crack suppression layer 15 may be 500%.

Figure 7:
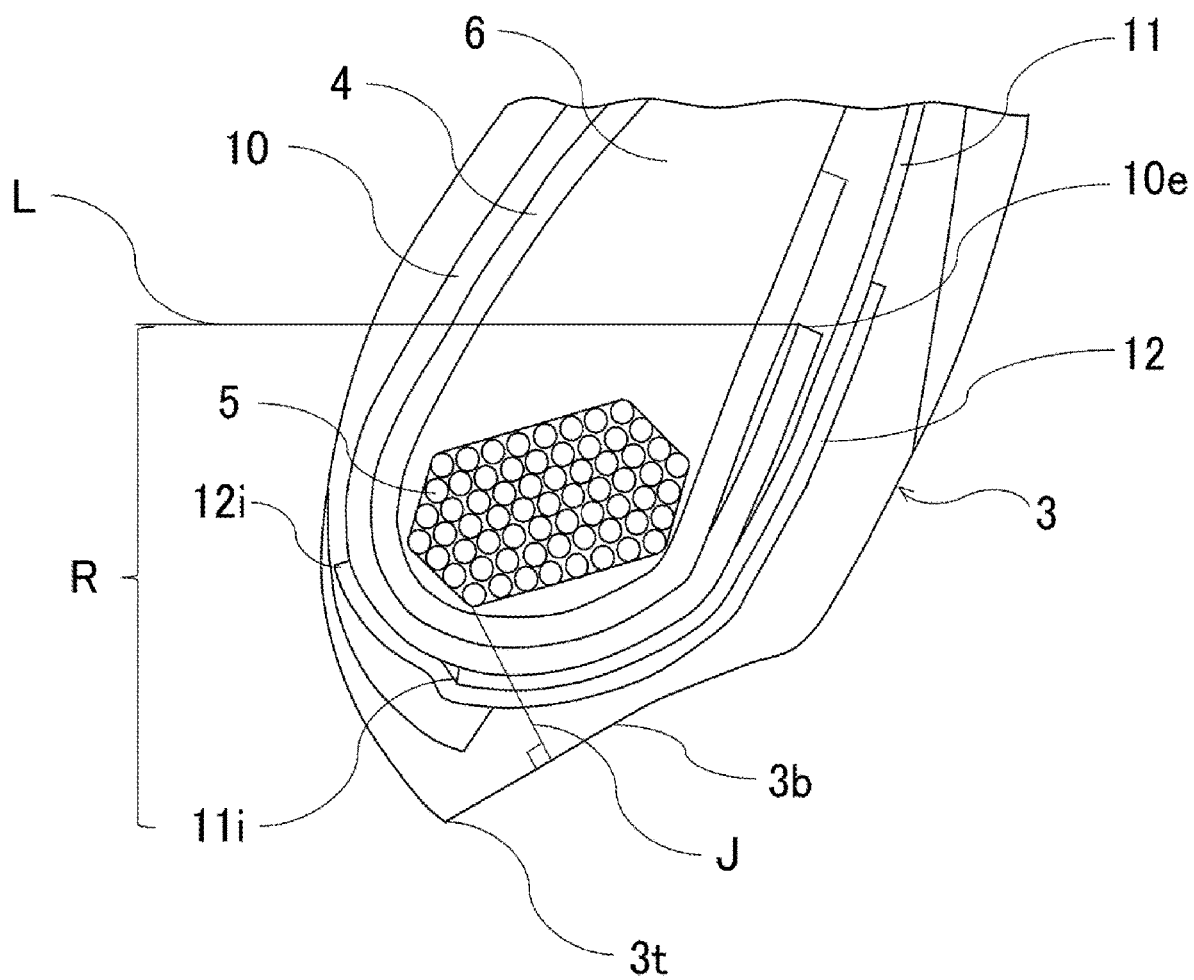
FIG. 7 is a cross-sectional view illustrating another modified example of the organic fiber reinforced layer embedded in the bead portion.

FIG. 7 illustrates another modified example of the organic fiber reinforced layer embedded in the bead portion. In FIG. 7, the first organic fiber reinforced layer 11 is an inner organic fiber reinforced layer 11 positioned on the inner side in the tire width direction, and the second organic fiber reinforced layer 12 is an outer organic fiber reinforced layer 12 positioned on the outer side in the tire width direction. The outer organic fiber reinforced layer 12 is disposed so as to cover the radially inner end portion 11i of the inner organic fiber reinforced layer 11, and the radially inner end portion 12i of the outer organic fiber reinforced layer 12 is separated from the radially inner end portion 11i of the inner organic fiber reinforced layer 11 by 5 mm or more, and is positioned more on the inner side in the tire radial direction than a line segment L formed by a horizontal line drawn in the tire width direction from the end portion 10e of the steel reinforced layer 10 on the outer side in the tire width direction. Note that the separation distance between the radially inner end portion 12i of the outer organic fiber reinforced layer 12 and the radially inner end portion 11i of the inner organic fiber reinforced layer 11 is measured along the steel reinforced layer 10.

When the above-described structure is adopted, the radially inner end portion 11i of the inner organic fiber reinforced layer 11 is covered with the outer organic fiber reinforced layer 12, and thus a rigid step portion (stress concentratedportion) is not formed at or near the toe 3t of the bead portion 3. Therefore, even if the toe 3t of the bead portion 3 is deformed when removing the rim, separation starting from the radially inner end portion 11i of the inner organic fiber reinforced layer 11 is less likely to occur. Since the radially inner end portion 12i of the outer organic fiber reinforced layer 12 is also disposed at an appropriate position, separation starting from the radially inner end portion 12i of the outer organic fiber reinforced layer 12 is less likely to occur.

Here, if the separation distance between the radially inner end portion 12i of the outer organic fiber reinforced layer 12 and the radially inner end portion 11i of the inner organic fiber reinforced layer 11 is less than 5 mm, the radially inner end portion 12i of the outer organic fiber reinforced layer 12 is positioned in the vicinity of the toe 3t of the bead portion 3, so that separation starting from the radially inner end portion 12i of the outer organic fiber reinforced layer 12 is likely to occur. A region R more on the inner side in the tire radial direction than a line segment L formed by a horizontal line drawn in the tire width direction from the end portion 10e of the steel reinforced layer 10 on the outer side in the tire width direction is a region with little motion during tire rolling, but when the radially inner end portion 12i of the outer organic fiber reinforced layer 12 is positioned more on the outer side in the tire radial direction than the line segment L, motion during tire rolling becomes large, so that separation is likely to occur from the radially inner end portion 12i of the outer organic fiber reinforced layer 12.

In the pneumatic tire described above, the fiber structures of the organic fiber cords constituting the first and second organic fiber reinforced layers 11 and 12 are preferably in the range 800 dtex/2 to 1500 dtex/2, respectively. By making the organic fiber cords constituting the first and second organic fiber reinforced layers 11 and 12 thin in this way, as illustrated in FIG. 7, the step portion formed when the second organic fiber reinforced layer 12 is disposed so as to cover the radially inner end portion 11i of the first organic fiber reinforced layer 11 can be made small, the stress concentration on the step portion can be reduced, and the separation starting from the step portion of the second organic fiber reinforced layer 12 can be suppressed. Since the organic fiber cords constituting the first and second organic fiber reinforced layers 11 and 12 have a necessary minimum thickness, an effect of suppressing the rubber flow can also be exhibited.

Here, if the fiber structure of the organic fiber cord is smaller than 800 dtex/2, the rubber flow in the bead portion 3 cannot be suppressed. Conversely, if the fiber structure of the organic fiber cord is larger than 1500 dtex/2, a step portion formed when one of the first and second organic fiber reinforced layers 11 and 12 is disposed so as to cover the radially inner end portion 11i, 12i of the other of the first and second organic fiber reinforced layer 11 becomes large, and suppression of separation caused by the stress concentration on the step portion is likely to occur.

Figure 8:
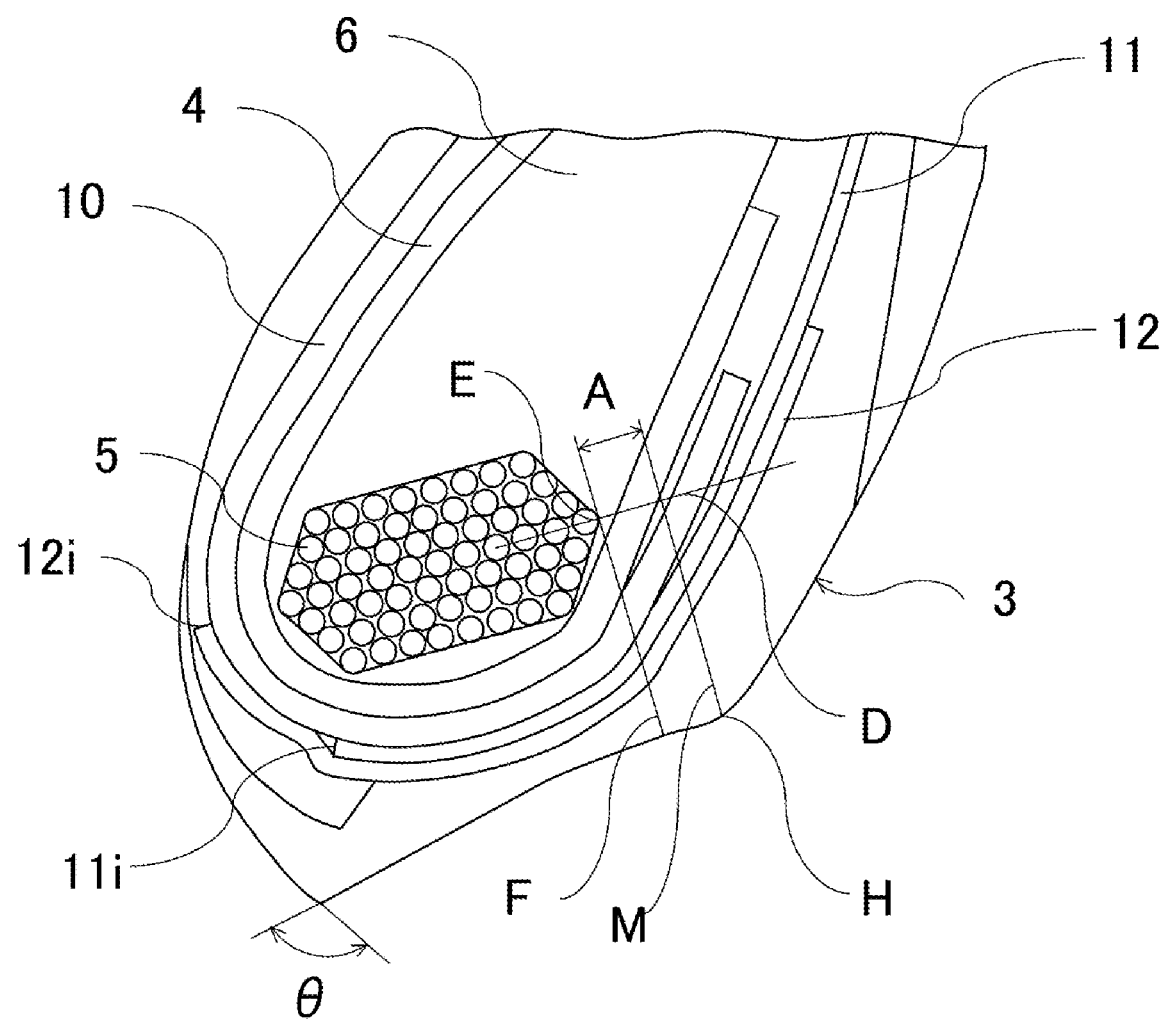
FIG. 8 is another cross-sectional view illustrating the organic fiber reinforced layer in FIG. 7.

In the pneumatic tire described above, as illustrated in FIG. 8, a distance A measured along a straight line D extending through an apex E of the bead core 5 protruding farthest to the outer side in the width direction and being parallel to a longest side of the bead core 5, the distance A being from the apex E to the bead heel position, is preferably in the range 2.5 mm≤A≤5.5 mm. By sufficiently securing the distance A in this way, the position of the bead core 5 is shifted to the toe 3t side of the bead portion 3, and the angle θ formed by the toe 3t of the bead portion 3 can be increased. As a result, the rigidity of the toe 3t of the bead portion 3 is increased, and separation starting from the radially inner end portion 11i of the first organic fiber reinforced layer 11 and the radially inner end portion 12i of the second organic fiber reinforced layer 12 is less likely to occur.

Note that a specific determination of the distance A is as follows. The bead core 5 has a multilayer structure in which a plurality of wires are arranged in a tire meridian cross-section. The apex E is a point where a straight line D extending through the center of gravity of a wire positioned on the outermost side of the bead core 5 in the width direction and being parallel to the longest side of the bead core 5 meets the contour of the wire positioned on the outermost side in the width direction. Here, when a straight line D, a virtual intersection point H, a straight line M, and a straight line F are determined, the straight line D extending through the apex E of the bead core 5 protruding farthest to the outer side in the width direction and being parallel to the longest side of the bead core 5, the virtual intersection point H being a point where an extension line of a side forming the profile of a bead bottom surface meets an extension line of a curve forming the profile of a bead back surface, the straight line M extending through the virtual intersection point H and being orthogonal to the straight line D, and the straight line F extending through the apex E and being orthogonal to the straight line D, the distance A is the length of a line segment on the straight line D defined between the straight line M and the straight line F.

Here, when the distance A is less than 2.5 mm, the position of the bead core 5 is not sufficiently shifted to the toe 3t side, and an increase in rigidity of the toe 3t is small, and thus the effect of suppressing the separation is reduced. On the other hand, when the distance A is more than 5.5 mm, an excessive cost increase occurs.

The pneumatic tire according to the embodiment described above may have a load index of 121 or more on a single wheel or a ply rating of 10 PR or more. In pneumatic tires having such a load index or ply rating, improving the durability of the bead portions is extremely meaningful.

EXAMPLES

Pneumatic tires according to Conventional Examples 1 and 2, Comparative Examples 1 to 3, and Examples 1 to 12 were manufactured. The tires had a tire size of 275/70R22.5, included a tread portion, a pair of sidewall portions, and a pair of bead portions, and included a carcass layer mounted between the pair of bead portions and including a plurality of steel cords, the carcass layer being turned up around a bead core of each of the bead portions from a tire inner side to a tire outer side, and a steel reinforced layer that includes a plurality of steel cords being disposed in each of the bead portions so as to wrap the carcass layer, the tires having first and second organic fiber reinforced layers (see FIG. 2) disposed in the bead portions and differing from one another only in the structure of the bead portions.

In the tires of Conventional Examples 1 and 2, Comparative Examples 1 to 3, and Examples 1 to 12, a distance $P_h$ from the bead heel apex to the turned-up end portion of the carcass layer, a distance $A_h$ from the bead heel apex to the radially outer end portion of the first organic fiber reinforced layer, a distance $B_h$ from the bead heel apex to the radially outer end portion of the second organic fiber reinforced layer, a position of the radially inner end portion of the first organic fiber reinforced layer, a position of the radially inner end portion of the second organic fiber reinforced layer, a cord angle $\theta_A$ of the first organic fiber reinforced layer in the tire, a cord angle $\theta_A'$ of the first organic fiber reinforced layer in the molding step, a cord angle $\theta_B$ of the second organic fiber reinforced layer in the tire, a cord angle $\theta_B'$ of the second organic fiber reinforced layer in the molding step, $|\theta_B|-|\theta_A|$, $A_h-P_h$, 100% modulus $Kc_{M100}$ of the crack suppression layer, and elongation at break $Kc_{EB}$ of the crack suppression layer were set as shown in Tables 1 and 2. The fiber structures of the organic fiber cords constituting the first organic fiber reinforced layer and the second organic fiber reinforced layer are both 1400 dtex/2.

Regarding the positions of the radially inner end portions of the first organic fiber reinforced layer and the second organic fiber reinforced layer, a case where the radially inner end portion is positioned more on the inner side in the tire width direction than the line segment J is referred to as "inner side", and a case where the radially inner end portion is positioned more on the outer side in the tire width direction than the line segment J is referred to as "outer side". When $A_h>P_h$, the radially outer end portion of the first organic fiber reinforced layer is positioned more on the outer side in the tire radial direction than the turned-up end portion of the carcass layer, and when $B_h<P_h$, the radially outer end portion of the second organic fiber reinforced layer is positioned more on the inner side in the tire radial direction than the turned-up end portion of the carcass layer.

The separation resistance (organic fiber reinforced layer, carcass layer) of these test tires was evaluated by the following test methods, and the results are shown in Tables 1 and 2.

Separation Resistance (Organic Fiber Reinforced Layer, Carcass Layer):

Each of the test tires was mounted on a rim specified by JATMA (The Japan Automobile Tyre Manufacturers Association Inc.), inflated to 75% of the air pressure specified by JATMA, and subjected to a load 1.4 times as heavy as the load specified by JATMA, and running tests were performed on a drum testing machine at a running speed of 49 km/h. After running 40,000 km, each test tire was cut at eight locations at equal intervals in the tire circumferential direction along the tire meridian, and the cross-sectional direction lengths of cracks starting from the end portion of the organic fiber reinforced layer and the turned-up end portion of the carcass layer were measured in cut sections at the eight locations of both bead portions (a total of 16 locations), respectively. The sum of the cross-sectional direction lengths of the cracks starting from the end portion of the organic fiber reinforced layer and the turned-up end portion of the carcass layer was obtained, respectively. Evaluation results are expressed as index values using the reciprocals of the measurement values, with Conventional Example 2 expressed as an index value of 100, for each of the organic fiber reinforced layer and the carcass layer. Larger index values indicate superior separation resistance.

TABLE 1-1

|  | Conventional Example 1 | Conventional Example 2 | Example 1 | Example 2 |
| --- | --- | --- | --- | --- |
| Distance $P_b$ of carcass layer (mm) | 33 | 33 | 33 | 33 |
| Distance $A_b$ of first organic fiber reinforced layer (mm) | 60 | 60 | 45 | 45 |

TABLE 1-1-continued

|  |  |  |  |  |
|---|---|---|---|---|
| Distance $B_h$ of second organic fiber reinforced layer (mm) | 50 |  | 25 | 25 |
| Position of radially inner end portion of first organic fiber reinforced layer | Inner side | Inner side | Inner side | Inner side |
| Position of radially inner end portion of second organic fiber reinforced layer | Inner side | Inner side | Inner side | Inner side |
| Cord angle $\theta_A$ (°) of first organic fiber reinforced layer in tire |  | 52 | 22 | 32 |
| Cord angle $\theta_A'$ (°) of first organic fiber reinforced layer in molding step | 30 | 45 | 20 | 30 |
| Cord angle $\theta_B$ (°) of second organic fiber reinforced layer in tire | — | −45 | −25 | −25 |
| Cord angle $\theta_B'$ (°) of second organic fiber reinforced layer in molding step | 30 | −45 | −25 | −25 |
| $|\theta_B| - |\theta_A|$ | — | −7 | 3 | −7 |
| $A_h - P_h$ (mm) | 22 | 27 | 12 | 12 |
| Modulus $Kc_{M100}$ (MPa) of crack suppression layer | 4.2 | 4.2 | 4.2 | 4.2 |
| Elongation at break $Kc_{EB}$ (%) of crack suppression layer | 200 | 200 | 200 | 200 |
| Separation resistance (organic fiber reinforced layer) | — | 100 | 185 | 165 |
| Separation resistance (carcass layer) | — | 100 | 100 | 100 |

|  | Example 3 | Example 4 | Example 5 | Example 6 | Example 7 |
|---|---|---|---|---|---|
| Distance $P_h$ of carcass layer (mm) | 33 | 33 | 33 | 33 | 33 |
| Distance $A_h$ of first organic fiber reinforced layer (mm) | 45 | 45 | 45 | 45 | 45 |
| Distance $B_h$ of second organic fiber reinforced layer (mm) | 25 | 25 | 25 | 25 | 25 |
| Position of radially inner end portion of first organic fiber reinforced layer | Inner side | Inner side | Inner side | Inner side | Inner side |
| Position of radially inner end portion of second organic fiber reinforced layer | Inner side | Inner side | Inner side | Inner side | Inner side |
| Cord angle $\theta_A$ (°) of first organic fiber reinforced layer in tire | 32 | 22 | 22 | 39 | 39 |
| Cord angle $\theta_A'$ (°) of first organic fiber reinforced layer in molding step | 30 | 20 | 20 | 37 | 37 |
| Cord angle $\theta_B$ (°) of second organic fiber reinforced layer in tire | −20 | −40 | −72 | −20 | −25 |
| Cord angle $\theta_B'$ (°) of second organic fiber reinforced layer in molding step | −20 | −40 | −72 | −20 | −25 |
| $|\theta_B| - |\theta_A|$ (°) | −12 | 18 | 50 | −19 | −14 |
| $A_h - P_h$ (mm) | 12 | 12 | 12 | 12 | 12 |
| Modulus $Kc_{M100}$ (MPa) of crack suppression layer | 4.2 | 4.2 | 4.2 | 4.2 | 4.2 |
| Elongation at break $Kc_{EB}$ (%) of crack suppression layer | 200 | 200 | 200 | 200 | 200 |
| Separation resistance (organic fiber reinforced layer) | 174 | 159 | 155 | 157 | 149 |
| Separation resistance (carcass layer) | 100 | 100 | 100 | 100 | 100 |

TABLE 2-1

|  | Example 8 | Example 9 | Example 10 | Example 11 |
|---|---|---|---|---|
| Distance $P_h$ of carcass layer (mm) | 33 | 33 | 33 | 33 |
| Distance $A_h$ of first organic fiber reinforced layer (mm) | 45 | 37 | 37 | 37 |
| Distance $B_h$ of second organic fiber reinforced layer (mm) | 25 | 25 | 25 | 25 |
| Position of radially inner end portion of first organic fiber reinforced layer | Inner side | Inner side | Inner side | Inner side |
| Position of radially inner end portion of second organic fiber reinforced layer | Inner side | Inner side | Inner side | Inner side |
| Cord angle $\theta_A$ (°) of first organic fiber reinforced layer in tire | 22 | 39 | 39 | 39 |
| Cord angle $\theta_A'$ (°) of first organic fiber reinforced layer in molding step | 20 | 37 | 37 | 37 |
| Cord angle $\theta_B$ (°) of second organic fiber reinforced layer in tire | 72 | −25 | −25 | −25 |

TABLE 2-1-continued

| | | | | |
|---|---|---|---|---|
| Cord angle $\theta_B'$ (°) of second organic fiber reinforced layer in molding step | 72 | −25 | −25 | −25 |
| $\|\theta_B\| - \|\theta_A\|$ (°) | 50 | −14 | −14 | −14 |
| $A_h - P_h$ (mm) | 12 | 4 | 12 | 12 |
| Modulus $Kc_{M100}$ (MPa) of crack suppression layer | 4.2. | 4.2 | 5.5 | 4.2 |
| Elongation at break $Kc_{EB}$ (%) of crack suppression layer | 200 | 200 | 370 | 370 |
| Separation resistance (organic fiber reinforced layer) | 155 | 149 | 149 | 149 |
| Separation resistance (carcass layer) | 92 | 98 | 106 | 104 |

| | Example 12 | Comparative Example 1 | Comparative Example 2 | Comparative Example 3 |
|---|---|---|---|---|
| Distance $P_h$ of carcass layer (mm) | 33 | 33 | 33 | 33 |
| Distance $A_h$ of first organic fiber reinforced layer (mm) | 37 | 45 | 45 | 45 |
| Distance $B_h$ of second organic fiber reinforced layer (mm) | 25 | 25 | 25 | 25 |
| Position of radially inner end portion of first organic fiber reinforced layer fiber reinforced layer | Inner side | Inner side | Inner side | Inner side |
| Position of radially inner end portion of second organic fiber reinforced layer | Inner side | Inner side | Inner side | Inner side |
| Cord angle $\theta_A$ (°) of first organic fiber reinforced layer in tire | 39 | 22 | 32 | 39 |
| Cord angle $\theta_A'$ (°) of first organic fiber reinforced layer in molding step | 37 | 20 | 30 | 37 |
| Cord angle $\theta_B$ (°) of second organic fiber reinforced layer in fire | −25 | −50 | −50 | −50 |
| Cord angle $\theta_B'$ (°) of second organic fiber reinforced layer in molding step | −25 | −50 | −50 | −50 |
| $\|\theta_B\| - \|\theta_A\|$ | −14 | 28 | 18 | 11 |
| $A_h - P_h$ (mm) | 12 | 12 | 12 | 12 |
| Modulus $Kc_{M100}$ (MPa) of crack suppression layer | 12.0 | 4.2 | 4.2 | 4.2 |
| Elongation at break $Kc_{EB}$ (%) of crack suppression layer | 200 | 200 | 200 | 200 |
| Separation resistance (organic fiber reinforced layer) | 149 | 141 | 121 | 105 |
| Separation resistance (carcass layer) | 102 | 100 | 100 | 100 |

As can be seen from Tables 1 and 2, in comparison with Conventional Example 2, the tires of Examples 1 to 12 were able to significantly improve the separation resistance related to the organic fiber reinforced layer while satisfactorily maintaining the separation resistance related to the carcass layer. Note that, in Conventional Example 1, a tire could not be obtained due to a failure during manufacturing. On the other hand, in the tires of Comparative Examples 1 to 3, since the cord angle of the second organic fiber reinforced layer was not appropriate, separation starting from the radially outer end portion of the second organic fiber reinforced layer was likely to occur.

Next, tires of Examples 13 to 17 in which a part of the tire structure of Example 1 was changed were manufactured. In the tires of Examples 13 to 17, the first organic fiber reinforced layer is an inner organic fiber reinforced layer, and the second organic fiber reinforced layer is an outer organic fiber reinforced layer. The fiber structure of the inner organic fiber reinforced layer, the position of the radially inner end portion of the inner fiber reinforced layer, the fiber structure of the outer organic fiber reinforced layer, the position of the radially inner end portion of the outer fiber reinforced layer, the presence of covering of the radially inner end portion of the inner fiber reinforced layer with the outer organic fiber reinforced layer, the distance between the radially inner end portion of the outer organic fiber reinforced layer and the radially inner end portion of the inner organic fiber reinforced layer, the bead core distance A, and the toe angle θ were set as shown in Table 3.

Regarding the position of the radially inner end portion of the inner organic fiber reinforced layer, a case where the radially inner end portion is positioned more on the inner side in the tire width direction than the line segment J is referred to as "inner side", and a case where the radially inner end portion is positioned more on the outer side in the tire width direction than the line segment J is referred to as "outer side". Regarding the position of the radially inner end portion of the outer organic fiber reinforced layer, a case where the radially inner end portion is positioned more on the inner side in the tire radial direction than the line segment L is referred to as "lower side", and a case where the radially inner end portion is positioned more on the outer side in the tire radial direction than the line segment L is referred to as "upper side".

The separation resistance (organic fiber reinforced layer) of these test tires was evaluated by the following test methods, and the results are shown in Table 3.

Separation Resistance (Organic Fiber Reinforced Layer):

Each of the test tires was mounted on a rim specified by JATMA, inflated to 75% of the air pressure specified by JATMA, and subjected to a load 1.4 times as heavy as the load specified by JATMA, and running tests were performed on a drum testing machine at a running speed of 49 km/h. After running 40,000 km, each test tire was cut at eight locations at equal intervals in the tire circumferential direction along the tire meridian, and the cross-sectional direction lengths of cracks starting from the end portion of the organic fiber reinforced layer were measured in cut sections at the eight locations of both bead portions (a total of 16 locations). Then, the sum of the cross-sectional direction lengths of the cracks starting from the end portion of the organic fiber reinforced layer was obtained. Evaluation results are expressed as index values using the reciprocals of the measurement values, with Conventional Example 2 expressed as an index value of 100. Larger index values indicate superior separation resistance.

TABLE 3

|  | Example 13 | Example 14 | Example 15 | Example 16 | Example 17 |
|---|---|---|---|---|---|
| Fiber structure (dtex/yarn) of inner organic fiber reinforced layer | 1400/2 | 1400/2 | 600/2 | 2100/2 | 1400/2 |
| Position of radially inner end portion of inner fiber reinforced layer | Inner side | Inner side | Inner side | Inner side | Inner side |
| Fiber structure (dtex/yarn) of outer organic fiber reinforced layer | 1400/2 | 1400/2 | 600/2 | 2100/2 | 1400/2 |
| Position of radially inner end portion of outer fiber reinforced layer | Lower side | Lower side | Lower side | Lower side | Lower side |
| Presence of covering of radially inner end portion of inner fiber reinforced layer | Yes | Yes | Yes | Yes | Yes |
| Distance (mm) between radially inner end portions of organic fiber reinforced layer | 15 | 8 | 15 | 15 | 15 |
| Distance A (mm) of bead core | 3.8 | 3.8 | 3.8 | 3.8 | 2.0 |
| Angle θ(°) of toe | 75 | 75 | 75 | 75 | 70 |
| Separation resistance (organic fiber reinforced layer) | 195 | 195 | 191 | 191 | 188 |

As can be seen from Table 3, in the tires of Examples 13 to 17, similarly to Examples 1 to 12, the separation resistance related to the organic fiber reinforced layer was good.

The invention claimed is:

1. A pneumatic tire, comprising:
a tread portion extending in a tire circumferential direction and having an annular shape;
a pair of sidewall portions disposed on both sides of the tread portion; and,
a pair of bead portions disposed on inner sides of the sidewall portions in a tire radial direction, a carcass layer being mounted between the pair of bead portions, the carcass layer being turned up around a bead core of each of the bead portions from a tire inner side to a tire outer side, and a steel reinforced layer comprising a plurality of steel cords being disposed in each of the bead portions so as to wrap the carcass layer, first and second organic fiber reinforced layers being disposed on an outer side of the steel reinforced layer in a tire width direction, each of the first and second organic fiber reinforced layers comprising a plurality of organic fiber cords arranged in one direction, and the organic fiber cords constituting the first and second organic fiber reinforced layers being oriented so as to cross each other between layers, a radially outer end portion of the first organic fiber reinforced layer being positioned more on an outer side in the tire radial direction than a turned-up end portion of the carcass layer, and a radially outer end portion of the second organic fiber reinforced layer being positioned more on an inner side in the tire radial direction than the turned-up end portion of the carcass layer and more on the outer side in the tire radial direction than a line segment formed by a horizontal line drawn in the tire width direction from an apex of the bead core protruding farthest to the outer side in the tire radial direction, radially inner end portions of the first and second organic fiber reinforced layers being both positioned more on an inner side in the tire width direction than a line segment formed by a normal line drawn from an apex of the bead core protruding farthest to the inner side in the tire radial direction to a surface of a bead base, and a cord angle θA of the first organic fiber reinforced layer with respect to the tire circumferential direction being in a range 20°≤|θA|≤45° or 70°≤|θA|≤90°, and a cord angle θB of the second organic fiber reinforced layer with respect to the tire circumferential direction being in a range 20°≤|θB|≤45° or 70°≤|θB|≤90°.

2. The pneumatic tire according to claim 1, wherein a distance Ah from a bead heel apex of the each of the bead portions to the radially outer end portion of the first organic fiber reinforced layer and a distance Ph from the bead heel apex of each of the bead portions to the turned-up end portion of the carcass layer satisfy a relationship Ah-Ph≥5.0 mm.

3. The pneumatic tire according to claim 1, wherein a crack suppression layer is embedded at a position adjacent to the turned-up end portion of the carcass layer, an end portion of the steel reinforced layer on the outer side in the tire width direction, the radially outer end portion of the first organic fiber reinforced layer, and the radially outer end portion of the second organic fiber reinforced layer, 100% modulus KcM100 of the crack suppression layer is in a range 4.5 MPa≤KcM100≤10.0 MPa, and elongation at break KcEB of the crack suppression layer is in a range 300%≤KcEB.

4. The pneumatic tire according to claim 1, wherein one of the first and second organic fiber reinforced layers is an inner organic fiber reinforced layer positioned on the inner side in the tire width direction, and the other of the first and second organic fiber reinforced layers is an outer organic fiber reinforced layer positioned on the outer side in the tire width direction, the outer organic fiber reinforced layer is disposed so as to cover a radially inner end portion of the inner organic fiber reinforced layer, and a radially inner end portion of the outer organic fiber reinforced layer is separated from the radially inner end portion of the inner organic fiber reinforced layer by 5 mm or more and is positioned more on the inner side in the tire radial direction than a line segment formed by a horizontal line drawn in the tire width direction from an end portion of the steel reinforced layer on the outer side in the tire width direction.

5. The pneumatic tire according to claim 1, wherein each of fiber structures of the organic fiber cords constituting the first and second organic fiber reinforced layers is in a range from 800 dtex/2 to 1500 dtex/2.

6. The pneumatic tire according to claim 1, wherein a distance A measured along a straight line extending through an apex of the bead core protruding farthest to an outer side in a width direction and being parallel to a longest side of the bead core, the distance A being from the apex to a bead heel position, is in a range 2.5 mm≤A≤5.5 mm.

7. The pneumatic tire according to claim 1, wherein cord inclination directions of the first and second organic fiber reinforced layers with respect to the tire circumferential direction are opposite to each other, and the cord angle θA of the first organic fiber reinforced layer with respect to the tire circumferential direction is in a range 20°≤|θA|≤45°.

8. The pneumatic tire according to claim 7, wherein a distance Ah from a bead heel apex of the bead portion to the radially outer end portion of the first organic fiber reinforced layer and a distance Ph from the bead heel apex of the bead portion to the turned-up end portion of the carcass layer satisfy a relationship Ah-Ph≥5.0 mm.

9. The pneumatic tire according to claim 8, wherein a crack suppression layer is embedded at a position adjacent to the turned-up end portion of the carcass layer, an end portion of the steel reinforced layer on the outer side in the tire width direction, the radially outer end portion of the first organic fiber reinforced layer, and the radially outer end portion of the second organic fiber reinforced layer, 100% modulus KcM100 of the crack suppression layer is in a range 4.5 MPa≤KcM100≤10.0 MPa, and elongation at break KcEB of the crack suppression layer is in a range 300%≤KcEB.

10. The pneumatic tire according to claim 9, wherein one of the first and second organic fiber reinforced layers is an inner organic fiber reinforced layer positioned on the inner side in the tire width direction, and the other of the first and second organic fiber reinforced layers is an outer organic fiber reinforced layer positioned on the outer side in the tire width direction, the outer organic fiber reinforced layer is disposed so as to cover a radially inner end portion of the inner organic fiber reinforced layer, and a radially inner end portion of the outer organic fiber reinforced layer is separated from the radially inner end portion of the inner organic fiber reinforced layer by 5 mm or more and is positioned more on the inner side in the tire radial direction than a line segment formed by a horizontal line drawn in the tire width direction from an end portion of the steel reinforced layer on the outer side in the tire width direction.

11. The pneumatic tire according to claim 10, wherein each of fiber structures of the organic fiber cords constituting the first and second organic fiber reinforced layers is in a range from 800 dtex/2 to 1500 dtex/2.

12. The pneumatic tire according to claim 11, wherein a distance A measured along a straight line extending through an apex of the bead core protruding farthest to an outer side in a width direction and being parallel to a longest side of the bead core, the distance A being from the apex to a bead heel position, is in a range 2.5 mm≤A≤5.5 mm.

13. The pneumatic tire according to claim 1, wherein cord inclination directions of the first and second organic fiber reinforced layers with respect to the tire circumferential direction are the same direction, the cord angle θA of the first organic fiber reinforced layer with respect to the tire circumferential direction is in a range 20°≤|θA|≤45°, and the cord angle θB of the second organic fiber reinforced layer with respect to the tire circumferential direction is in a range |θA|+20≤|θB|.

14. The pneumatic tire according to claim 13, wherein a distance Ah from a bead heel apex of the bead portion to the radially outer end portion of the first organic fiber reinforced layer and a distance Ph from the bead heel apex of the bead portion to the turned-up end portion of the carcass layer satisfy a relationship Ah-Ph≥5.0 mm.

15. The pneumatic tire according to claim 14, wherein a crack suppression layer is embedded at a position adjacent to the turned-up end portion of the carcass layer, an end portion of the steel reinforced layer on the outer side in the tire width direction, the radially outer end portion of the first organic fiber reinforced layer, and the radially outer end portion of the second organic fiber reinforced layer, 100% modulus KcM100 of the crack suppression layer is in a range 4.5 MPa≤KcM100≤10.0 MPa, and elongation at break KcEB of the crack suppression layer is in a range 300%≤KcEB.

16. The pneumatic tire according to claim 15, wherein one of the first and second organic fiber reinforced layers is an inner organic fiber reinforced layer positioned on the inner side in the tire width direction, and the other of the first and second organic fiber reinforced layers is an outer organic fiber reinforced layer positioned on the outer side in the tire width direction, the outer organic fiber reinforced layer is disposed so as to cover a radially inner end portion of the inner organic fiber reinforced layer, and a radially inner end portion of the outer organic fiber reinforced layer is separated from the radially inner end portion of the inner organic fiber reinforced layer by 5 mm or more and is positioned more on the inner side in the tire radial direction than a line segment formed by a horizontal line drawn in the tire width direction from an end portion of the steel reinforced layer on the outer side in the tire width direction.

17. The pneumatic tire according to claim 16, wherein each of fiber structures of the organic fiber cords constituting the first and second organic fiber reinforced layers is in a range from 800 dtex/2 to 1500 dtex/2.

18. The pneumatic tire according to claim 17, wherein a distance A measured along a straight line extending through an apex of the bead core protruding farthest to an outer side in a width direction and being parallel to a longest side of the bead core, the distance A being from the apex to a bead heel position, is in a range 2.5 mm≤A≤5.5 mm.

* * * * *